United States Patent
Li et al.

(10) Patent No.: US 12,394,141 B2
(45) Date of Patent: Aug. 19, 2025

(54) MODEL GENERATION METHOD AND APPARATUS, IMAGE PERSPECTIVE DETERMINING METHOD AND APPARATUS, DEVICE, AND MEDIUM

(71) Applicant: Beijing Jingdong Qianshi Technology Co., Ltd., Beijing (CN)

(72) Inventors: Yanli Li, Beijing (CN); Dongdong Liu, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 396 days.

(21) Appl. No.: 17/928,553

(22) PCT Filed: Jun. 8, 2021

(86) PCT No.: PCT/CN2021/098942
§ 371 (c)(1),
(2) Date: Nov. 29, 2022

(87) PCT Pub. No.: WO2021/249401
PCT Pub. Date: Dec. 16, 2021

(65) Prior Publication Data
US 2023/0351677 A1   Nov. 2, 2023

(30) Foreign Application Priority Data
Jun. 8, 2020   (CN) .......................... 202010514388.2

(51) Int. Cl.
*G06T 7/73* (2017.01)
*G06T 15/20* (2011.01)

(52) U.S. Cl.
CPC .............. *G06T 15/205* (2013.01); *G06T 7/73* (2017.01); *G06T 2207/10028* (2013.01);
(Continued)

(58) Field of Classification Search
CPC ................... G06T 15/205; G06T 7/73; G06T 2207/10028; G06T 2207/20081; G06T 2207/20084; G06T 2210/56
(Continued)

(56) References Cited

U.S. PATENT DOCUMENTS 1,110,728 A * 9/1914 Till .......................... B67B 7/24
220/278
2016/0179830 A1 * 6/2016 Schmalstieg ....... G06F 16/2264
707/722
(Continued)

FOREIGN PATENT DOCUMENTS

CN   106780601 A   5/2017
CN   107958482 A   4/2018
(Continued)

OTHER PUBLICATIONS

S. Milz et al. (2019). Points2Pix: 3D Point-Cloud to Image Translation Using Conditional Generative Adversarial Networks. Accessed: Jan. 1, 2019. [Online]. Available: https://ui.adsabs.harvard.edu/abs/2019arXiv190109280M.*
(Continued)

*Primary Examiner* — Jin Ge
(74) *Attorney, Agent, or Firm* — K&L Gates LLP

(57) ABSTRACT

Provided are a model generation method and apparatus, an image perspective determining method and apparatus, a device, and a medium. The model generation method includes that: point cloud data and multiple image perspectives are collected to obtain coordinate data of the point cloud data and multiple image collection time points; a pose matrix corresponding to each image collection time point is determined, and a point cloud perspective at each image collection time point is generated according to the pose matrix and the coordinate data; and the point cloud perspective at each image collection time point and the respective
(Continued)

one image perspective at the each image collection time point are used as a group of training samples, an original neural network model is trained based on multiple groups of training samples, and an image conversion model for converting a point cloud perspective into an image perspective is generated.

9 Claims, 6 Drawing Sheets

(52) U.S. Cl.
CPC ............... *G06T 2207/20081* (2013.01); *G06T 2207/20084* (2013.01); *G06T 2210/56* (2013.01)

(58) Field of Classification Search
USPC ........................................................ 345/419
See application file for complete search history.

(56) References Cited

U.S. PATENT DOCUMENTS

| | | | |
|---|---|---|---|
| 2018/0075618 A1 | 3/2018 | Lai et al. | |
| 2019/0096086 A1 | 3/2019 | Xu et al. | |
| 2019/0287311 A1* | 9/2019 | Bhatnagar | G06T 15/08 |
| 2020/0092529 A1 | 3/2020 | Yoshida | |
| 2021/0004660 A1* | 1/2021 | Ambrus | G06N 3/08 |
| 2021/0201569 A1* | 7/2021 | Marschner | G01S 17/89 |
| 2021/0256765 A1* | 8/2021 | Huo | G06T 19/006 |
| 2022/0027654 A1* | 1/2022 | Iwami | G06V 20/00 |
| 2023/0049158 A1* | 2/2023 | Matarazzo | A01G 7/00 |

FOREIGN PATENT DOCUMENTS

| | | |
|---|---|---|
| CN | 109087340 A | 12/2018 |
| CN | 109118532 A | 1/2019 |
| CN | 110895833 A | 3/2020 |
| JP | 2019145089 A | 8/2019 |
| JP | 2019185295 A | 10/2019 |

OTHER PUBLICATIONS

Peng Dai, Yinda Zhang, Zhuwen Li, Shuaicheng Liu, and Bing Zeng. Neural Point Cloud Rendering via Multi-Plane Projection. In CVPR, Dec. 2019.*
Z. Ouyang and et al., "A cgans-based scene reconstruct ion model using lidar point cloud," in IEEE International Symposium on Parallel and Distributed Processing with Applications. IEEE, 2017.*
Milz, et al., Points2Pix: 3D Point-Cloud to Image Translation using Conditional GANs, arXiv:1901.09280v2 [cs.CV] Sep. 16, 2019.
English Translation of Japanese Office Action dated Sep. 12, 2023 for Japanese Application No. 2022-564397.
English Translation of Chinese Search Report dated Jun. 30, 2023 for Chinese Application No. 2020105143882.
English Translation of Chinese Office Action dated Jul. 4, 2023 for Chinese Application No. 202010514388.2.
PCT International Search Report dated Sep. 7, 2021, for International Patent Application No. PCT/CN2021/098942.
Ouyang Zhenchao et al: "A cGANs-Based Scene Reconstruction Model Using Lidar Point Cloud", 2017 IEEE International Symposium on Parallel and Distributed Processing With Applications and 2017 IEEE International Conference on Ubiquitous Computing and Communications (ISPA/IUCC), IEEE, Dec. 12, 2017 (Dec. 12, 2017), pp. 1107-1114.
Search Report from related European Patent Application No. 21823023.3 issued Apr. 11, 2024.

* cited by examiner

MODEL GENERATION METHOD AND APPARATUS, IMAGE PERSPECTIVE DETERMINING METHOD AND APPARATUS, DEVICE, AND MEDIUM

CROSS-REFERENCE TO RELATED APPLICATIONS

This patent application is a 35 U.S.C. § 371 National Stage filing based on International Application No. PCT/CN2021/098942, filed on Jun. 8, 2021, which application claims priority benefit to Chinese Patent Application No. 202010514388.2, filed on Jun. 8, 2020, the disclosures of which are incorporated herein by reference in their entireties.

This application claims priority to Chinese Patent Application No. 202010514388.2 filed with the China National Intellectual Property Administration (CNIPA) on Jun. 8, 2020, the disclosure of which is incorporated herein by reference in its entirety.

TECHNICAL FIELD

Embodiments of the present application relate to the technical field of data processing, for example, a model generation method and apparatus, an image perspective determining method and apparatus, a device, and a medium.

BACKGROUND

With the advancement and development of industries such as virtual simulation, high-precision map making, robots, automatic driving, the application of point cloud mapping is increasingly extensive. The point cloud mapping is to collect point cloud data under a scene of a map to be built at each moment based on a lidar device, acquire three-dimensional coordinates of the point cloud data at each moment based on a surveying and mapping manner or a simultaneous localization and mapping (SLAM) manner, and then project and merge point cloud data at multiple moments according to the three-dimensional coordinates.

Only the three-dimensional coordinates of the point cloud data at multiple moments may be acquired through a simple point cloud mapping, and thus information is relatively simple. In order to solve this problem, in a point cloud mapping process, a camera may be built to synchronously collect data to generate an image perspective at a corresponding moment, and therefore more applications are developed by utilizing a multi-data-source fusion. For example, in simulation reconstruction, a time-space calibration is performed on the lidar device and the camera to acquire color point cloud data, the image perspective is used for assisting in viewing a real scene in the mapping process, and identification of dynamic objects such as lanes and pedestrians is improved by using the image perspective in an intelligent perception.

The following technical issues exist in the related art: an acquisition process of the above image perspective is time-consuming and labor-intensive, firstly, the complex synchronization system of the lidar device and the camera need to be built, and the time-space calibration is performed on the lidar device and the camera, and the time-space calibration process is usually complicated; secondly, in order to acquire a high-quality and omnidirectional image perspective, the adopted camera is usually expensive, for example, the cost of a 360-degree panoramic Ladybug3 is as high as more than two hundred thousand; moreover, the quality of the image perspective collected by the camera is easily affected by environmental factors such as weather, illumination and shadow, for example, an image brightness of the image perspective collected in a dark light environment is low, and shaking and blurring are easily caused when the speed of the vehicle is too fast.

SUMMARY

Embodiments of the present application provide a model generation method and apparatus, an image perspective determining method and apparatus, a device, and a medium, to solve the problem that an acquiring process of an image perspective is relatively time-consuming and labor-intensive.

In a first aspect, an embodiment of the present application provides a model generation method. The method may include that: point cloud data and multiple image perspectives are collected based on a preset collection system to obtain coordinate data of the point cloud data and multiple image collection time points, where each image collection time point of the multiple image collection time points corresponds to a respective one image perspective of the multiple image perspectives; a pose matrix corresponding to each image collection time point of the multiple image collection time points is determined, and a point cloud perspective at each image collection time point is generated according to the pose matrix corresponding to the each image collection time point and the coordinate data; and the point cloud perspective at each image collection time point and the respective one image perspective at the each image collection time point are used as a group of training samples, an original neural network model is trained based on multiple groups of training samples, and an image conversion model for converting a point cloud perspective into an image perspective is generated.

In a second aspect, an embodiment of the present application further provides an image perspective determining method. The method may include that: point cloud data is collected based on a preset collection system to obtain coordinate data of the point cloud data and a point cloud collection time point, a pose matrix corresponding to the point cloud collection time point is determined, and a point cloud perspective at the point cloud collection time point is generated according to the pose matrix and the coordinate data; and the image conversion model generated according to the model generation method of any embodiment of the present application is acquired, the point cloud perspective is input into the image conversion model, and an image perspective at the point cloud collection time point is determined according to an output result of the image conversion model.

In a third aspect, an embodiment of the present application further provides a model generation apparatus. The model generation apparatus may include a data acquisition module, a first generation module and a second generation module. The data acquisition module is configured to collect point cloud data and multiple image perspectives based on a preset collection system to obtain coordinate data of the point cloud data and multiple image collection time points, where each image collection time point of the multiple image collection time points corresponds to a respective one image perspective of the multiple image perspectives. The first generation module is configured to determine a pose matrix corresponding to each image collection time point of the multiple image collection time points, and generate a point cloud perspective at each image collection time point according to the pose matrix corresponding to the each image collection time point and the coordinate data. The second generation module is configured to use the point cloud perspective at each image collection time point and the respective one image perspective at the each image collection time point as a group of training samples, train an original neural network model based on multiple groups of training samples, and generate an image conversion model for converting a point cloud perspective into an image perspective.

In a fourth aspect, an embodiment of the present application further provides an image perspective determining apparatus. The image perspective determining apparatus may include a third generation module and an image perspective determination module. The third generation module is configured to collect point cloud data based on a preset collection system to obtain coordinate data of the point cloud data and a point cloud collection time point, determine a pose matrix corresponding to the point cloud collection time point, and generate a point cloud perspective at the point cloud collection time point according to the pose matrix and the coordinate data. The image perspective determination module is configured to acquire the image conversion model generated according to the model generation method of any embodiment of the present application, input the point cloud perspective into the image conversion model, and determine an image perspective at the point cloud collection time point according to an output result of the image conversion model.

In a fifth aspect, an embodiment of the present application further provides a device. The device may include at least one processor and a memory. The memory is configured to store at least one program. The at least one programs, when executed by the at least one processor, causes the at least one processor to implement the model generation method or the image perspective determining method provided in any embodiment of the present application.

In a sixth aspect, an embodiment of the present application further provides a computer-readable storage medium. The computer-readable storage medium stores a computer program. The computer program, when executed by a processor, implements the model generation method or the image perspective determining method provided in any embodiment of the present application.

DETAILED DESCRIPTION

The present application will be further described in detail in conjunction with the drawings and embodiments below.

Embodiment One

Figure 1:
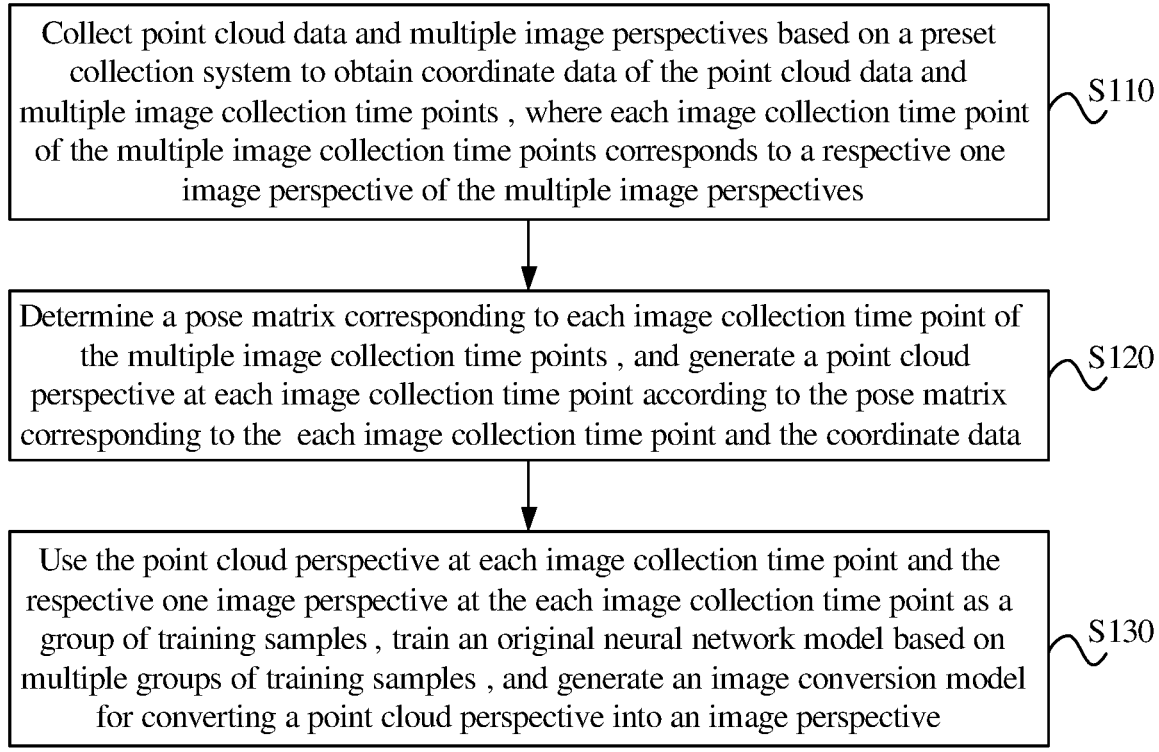
FIG. 1 is a flowchart of a model generation method according to embodiment one of the present application.

FIG. 1 is a flowchart of a model generation method according to embodiment one of the present application. This embodiment may be applicable in a case of generating an image conversion model for converting a point cloud perspective into an image perspective. The method may be executed by a model generation apparatus provided in an embodiment of the present application, the apparatus may be implemented by software and/or hardware, and the apparatus may be integrated on various user terminals or servers.

Referring to FIG. 1, the method in the embodiment of the present application includes the steps described below.

In S110, point cloud data and multiple image perspectives are collected based on a preset collection system to obtain coordinate data of the point cloud data and multiple image collection time points, where each image collection time point of the multiple image collection time points corresponds to a respective one image perspective of the multiple image perspectives.

Figure 2:
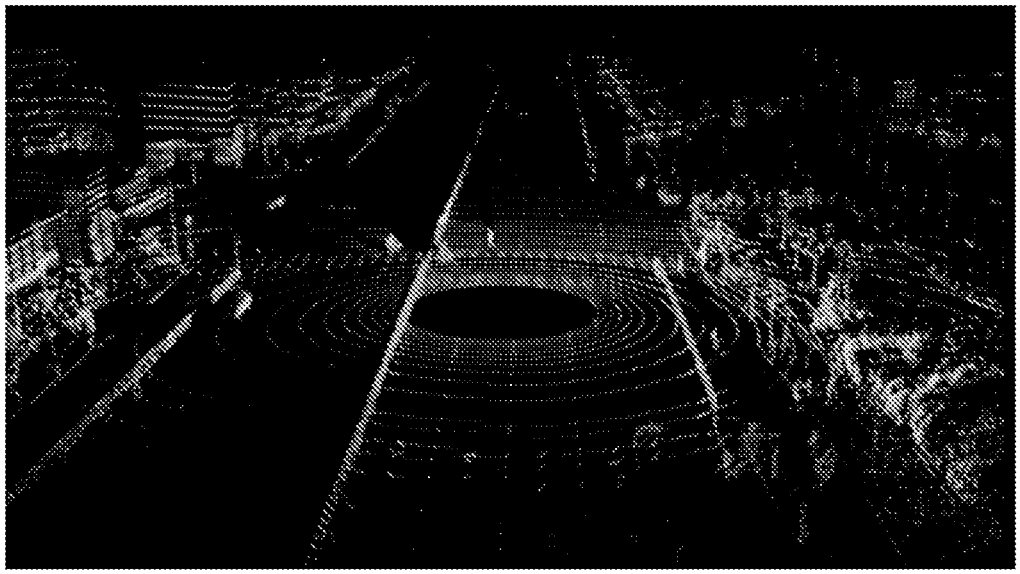
FIG. 2 is a first schematic diagram of a point cloud mapping in a model generation method according to embodiment one of the present application.

The point cloud data is data in a scene of a map to be built collected by a point cloud collection device in the preset collection system, such as point cloud data collected by a lidar scanning device, a virtual scene thinning device or a multi-view reconstruction device. The image perspective is a perspective collected by an image collection device in the preset collection system. The image collection device may be a spherical panoramic camera, a wide-angle camera, a common distortion-free perspective camera or the like, and correspondingly, the collected image perspective may be a spherical panoramic image, a wide-angle image, a common distortion-free perspective image or the like, which is not limited herein. After the point cloud data is collected, the point cloud data may be mapped as shown in FIG. 2, coordinate data of multiple pieces of point cloud data are obtained in a mapping process, and a mapping manner may be a surveying and mapping manner, an SLAM manner or the like and is not limited here, and correspondingly, after the image perspective is collected, an image collection time point of each frame of image perspective may be acquired, where the image collection time point is a time point at which the image perspective is collected.

In S120, a pose matrix corresponding to each image collection time point of the multiple image collection time points is determined, and a point cloud perspective at each image collection time point is generated according to the pose matrix corresponding to the each image collection time point and the coordinate data.

Figure 3A:
FIG. 3A is a second schematic diagram of a point cloud mapping in a model generation method according to embodiment one of the present application.
Figure 3B:
FIG. 3B is a schematic diagram of a point cloud perspective in a model generation method according to embodiment one of the present application.

The pose matrix is a matrix of the point cloud acquisition device in a coordinate system where coordinate data of the point cloud data is located when the point cloud acquisition device is at a certain image collection time point, and the pose matrix includes a rotation matrix and a translation vector. In practical application, if a mapping is performed based on a surveying and mapping manner, the pose matrix may be acquired from combined inertial navigation data; and if a mapping is based on the SLAM manner, the pose matrix may be provided by an SLAM algorithm. After the pose matrix is acquired, a local coordinate system of the image collection device at the image collection time point may be obtained according to the pose matrix, or a local coordinate system of the image collection device at the image acquisition position at the image collection time point may be obtained according to the pose matrix, whereby the coordinate data of the point cloud data may be converted into the local coordinate system. In this way, the point cloud perspective at the image collection time point may be obtained according to the converted coordinate data. For example, point cloud data under a scene to be mapped obtained after a point cloud mapping is performed is shown in FIG. 3A, and a point cloud perspective synthesized based on the point cloud data and a corresponding pose matrix is shown in FIG. 3B.

In an embodiment, the pose matrix described above may be determined through the following steps that: a pose trajectory of the present collection system is obtained according to the point cloud data, the pose trajectory may be obtained in a mapping process of the point cloud data and may present the change of the pose of the preset collection system in a moving process, and the pose may include a position and a pose. In a practical application, if a mapping is performed based on the surveying and mapping manner, the poses of the preset collection system at multiple collection time points may be acquired based on combined inertial navigation in the preset collection system; and if the mapping is performed based on the SLAM manner, the poses of the preset collection system at multiple collection time points may be acquired based on the SLAM algorithm. Further, the pose trajectory is sampled based on multiple image collection time points, and a pose matrix corresponding to each image collection time point is obtained according to a sampling result.

In S130, the point cloud perspective at each image collection time point and the respective one image perspective at the each image collection time point are used as a group of training samples, an original neural network model is trained based on multiple groups of training samples, and an image conversion model for converting a point cloud perspective into an image perspective is generated.

One point cloud perspective and one image perspective exist at each image collection time point and thus they may be used as one group of training samples, where the point cloud perspective is used as actual input data, and the image perspective is used as expected output data, so that the original neural network model may be trained based on multiple groups of training samples and an image conversion model for converting a point cloud perspective to an image perspective is generated.

Figure 4A:
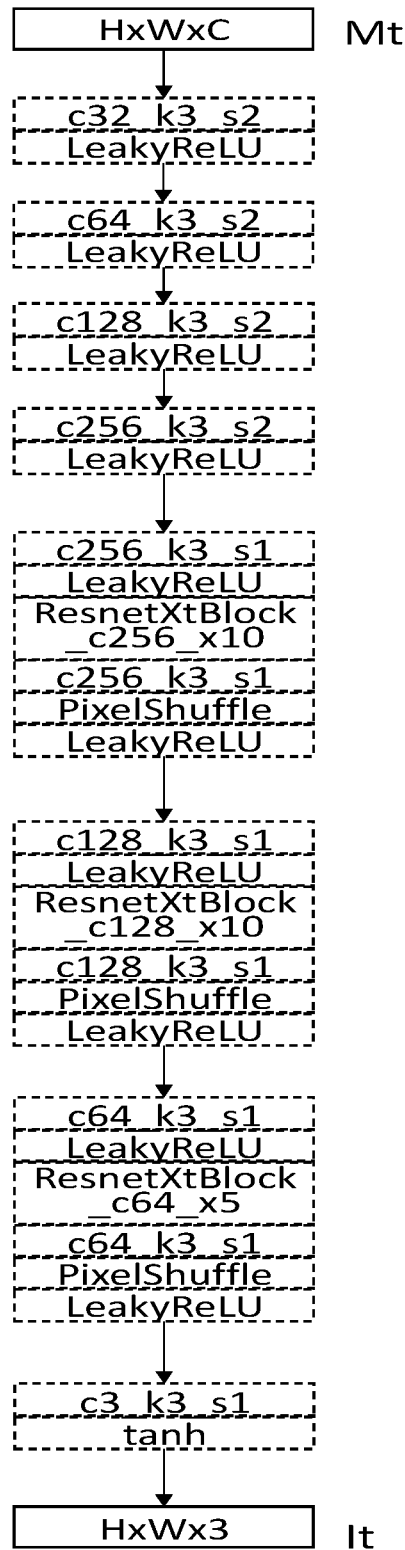
FIG. 4A is a schematic diagram of an original neural network model for a single frame conversion in a model generation method according to embodiment one of the present application.

It should be noted that the original neural network model is any untrained convolution neural network model that may convert the point cloud perspective into the image perspective, and a schematic diagram of an optional original neural network model is shown in FIG. 4A, which is an image conversion model for converting a single frame point cloud perspective into a single frame image perspective. Exemplarily, the solid line is a data layer; Mt in the data layer is a point cloud perspective with dimension H*W*C, where C may be a number of pieces of attribute information of the point cloud data, for example, when the attribute information is intensity information and semantic information, C=2, and for another example, when the attribute information is color information (R/G/B), C=3; and It in the data layer is the image perspective with dimension H*W*3, where 3 is the color information (R/G/B). The dashed line is a network layer, neurons in the network layer may include a convolution layer cxx_kx_sx, an excitation layer leakyPeLU, a convolution block layer ResnetXtBlock_cxx_xx, an up-sampling layer PixelShuffle, an excitation layer tanh, and the like. Exemplarily, the convolution layer c32_k3_s2 is convolved with 32 convolution kernels with step size 2(s2) having a size (k3) of 3×3, and the rest of the convolution layers have similar meanings and are not described in detail herein; the parameter of the excitation layer leakyPeLU may be 0.2 or other numerical values; the convolution block layer ResnetXtBlock_c256_x10 is formed by sequentially connecting 10 sets of ResnetXtBlocks in series, the internal convolution layer may uniformly use a convolution kernel with step size 2(s2) having the size (k3) of 3×3, or may use other convolution kernels, c256 is a number of the convolution kernels, and the other convolution block layers are similar in meaning and are not repeated here; PixelShuffle may be 2 times the up-sampling.

According to the technical scheme of the embodiment of the present application, the point cloud data and multiple image perspectives are collected based on the preset collection system to obtain the coordinate data of the point cloud data and multiple image collection time points, where each image collection time point corresponds to a respective one image perspective of the multiple image perspectives; further, after the pose matrix corresponding to each image collection time point of the multiple image collection time points is determined, the point cloud perspective at each image collection time point may be generated according to the pose matrix corresponding to the each image collection time point and the coordinate data, that is, point cloud data of three-dimensional scene points is projected to a virtual camera at the image collection time point to form the point cloud perspective, whereby the point cloud perspective at each image collection time point and the respective one image perspective at the each image collection time point are used as a group of training samples, the original neural network model is trained based on the multiple sets of training samples, and an image conversion model for converting the point cloud perspective into the image perspective may be generated. According to the above technical scheme, the image perspective may be guided and synthesized based on the point cloud perspective projected by the point cloud data, and thus the problem that the acquiring process of the image perspective is relatively time-consuming and labor-intensive is solved, and the effect of acquiring the image perspective with a high quality in a manner of simple operation and low cost is achieved.

In an optional technical scheme, after the point cloud perspective is generated, pixel points corresponding to the point cloud data in the point cloud perspective may be acquired, and attribute information of the point cloud data may be assigned to the pixel point, and the attribute information may be intensity information, semantic information, color information and the like. Exemplarily, the intensity information may be acquired according to the reflection of the lidar scanning device, and the semantic information may be acquired based on a point cloud analysis. The advantage of the above-described steps is that, considering that a camera imaging process is a process of projecting three-dimensional scene points of a scene to be mapped on a camera negative film, each pixel point in an image perspective obtained after the projection records color information (R/G/B) of the three-dimensional scene points; correspondingly, the point cloud perspective is a process of reconstructing a projection of the three-dimensional scene points on the camera negative film, and each pixel point in the point cloud perspective records the attribute information of the three-dimensional scene points, which means that the point cloud perspective and the image perspective have strong correlation, and this correlation improves the synthesis accuracy of synthesizing the image perspective based on the point cloud perspective.

Considering that the pixel points of the point cloud data in the scene to be mapped that are projected to the point cloud perspective may be in a many-to-one relationship, if multiple pieces of point cloud data correspond to one pixel point, then the attribute information of the point cloud data closest to the camera may be assigned to the pixel point, which conforms to the viewing rule of human eyes, and when a three-dimensional scene point in the front blocks a three-dimensional scene point at the back, human eyes may only see the three-dimensional scene point in the front (i.e., the point cloud data closest to the camera among the multiple pieces of point cloud data) and cannot see the three-dimensional scene point which is blocked at the back (i.e., the point cloud data except the point cloud data closest to the camera among the multiple pieces of point cloud data).

In an optional technical scheme, it is considered that a synthesis process of a point cloud perspective is an imaging process of a simulated real three-dimensional scene point in which point cloud data within a certain range around a real camera or a virtual camera is projected onto a camera negative film, for example, the position of the camera is used as a center, all point cloud data within a circle having a 500 meter radius is projected onto the camera negative film. In other words, according to the photography geometry theory, the point cloud perspective is a perspective formed by projecting real three-dimensional scene points to the camera negative film according to the perspective relationship. Thus, the image collection device may be a preset camera, which may be a perspective camera, a wide-angle camera, or a spherical panorama camera. When the pose of the point cloud acquisition device is consistent with the pose of the image collection device, the step in which the point cloud perspective at each image collection time point is generated according to the pose matrix corresponding to the each image collection time point and the coordinate data may include that: the image perspective is collected based on a preset camera in the preset collection system, three-dimensional coordinate data $P_{W\_3d}$ of the point cloud data in a world coordinate system is projected to two-dimensional coordinate data $P_{C\_2d}(t_C)$ in a preset camera coordinate system collected at an image collection time point $t_C$ according to the following formula, and the point cloud perspective at $t_C$ is generated according to $P_{C\_2d}(t_C)$: $P_{C\_2d}(t_C)=K_C M_{W \to L}(t_C) P_{W\_3d}$, where $M_{W \to L}(t_C)$ is the pose matrix of a point cloud collection device in the preset collection system in the world coordinate system at $t_C$, and $K_c$ is an internal reference matrix of the preset camera; and $P_{C\_2d}(t_C)$ is two-dimensional coordinate data of pixel points projected on a point cloud perspective by point cloud data with three-dimensional coordinate data $P_{W\_3d}$, so that the point cloud perspective may be generated according to the two-dimensional coordinate data of multiple pixel points.

Similarly, if the image perspective is collected based on the spherical panorama camera in the preset collection system, three-dimensional scene points are projected to a spherical surface, the spherical surface is expanded according to longitude and latitude to form a spherical panorama, and therefore point cloud data $P_{W\_3d}$ may be projected to $P_{C\_2d}(t_C)$ in the spherical panorama camera coordinate system collected at $t_C$ according to the following formula, and the point cloud perspective at $t_C$ is generated according to multiple $P_{C\_2d}(t_C)$:

$$P_{3d}=M_{W \to L}(t_C)P_{W\_3d}, P_{3d}=[x_{3d}, y_{3d}, z_{3d}],$$

$$P_{2d}=R[\arctan(\sqrt{x_{3d}^2+z_{3d}^2}/y_{3d})+\pi, \arctan(x_{3d}/z_{3d})+\pi/2],$$

R is a sphere radius of the spherical panorama camera, and $P_{C\_2d}(t_C)$ is two-dimensional coordinate data of pixel points projected on a point cloud perspective (i.e., the spherical overview) by point cloud data with three-dimensional coordinate data $P_{W\_3d}$.

In an optional technical scheme, when the image perspective is guided and synthesized based on the point cloud perspective, in order to guarantee space-time correlation to avoid time sequence jump caused by one-to-one analysis of independent frames, the point cloud perspectives at at least two image acquisition times and the image perspectives corresponding to the point cloud perspectives at the at least two image acquisition times may be jointly used as training samples to train the original neural network model. Exemplarily, a point cloud perspective at a current image collection time point of multiple image collection time points is used as a first point cloud perspective, and an image perspective at the current image collection time point is used as a first image perspective; a point cloud perspective at at least one image collection time point before the current image collection time point is used as a second point cloud perspective, and an image perspective corresponding to the point cloud perspective at the at least one image collection time point before the current image collection time point is used as a second image perspective, the number of the second point cloud perspectives is at least one, the number of the second image perspectives is at least one, and the at least one second point cloud perspective and the at least one second image perspective are in one-to-one correspondence. The first point cloud perspective, the second point cloud perspective, the first image perspective, and the second image perspective are used as one group of training samples, where the first point cloud perspective, the second point cloud perspective, and the second image perspective are actual input data, and the first image perspective is expected output data.

On the basis, an original neural network model matched with the training samples may include a point cloud convolution excitation module, an image convolution excitation module and a merging processing module, and therefore, the step in which the original neural network model is trained based on the multiple groups of training samples may include that: the groups of training samples are input into the original neural network model; a channel cascade result of the first point cloud perspective and the second point cloud perspective is processed through the point cloud convolution excitation module to obtain a point cloud feature map, and the second image perspective is processed through the image convolution excitation module to obtain an image feature map, of course, if the number of the second image perspectives is at least two, then a channel cascade is performed on the at least two second image perspectives, and then the channel cascade result of the second image perspectives is processed; and the point cloud feature map and the image feature map are merged through a merging processing module, and a third image perspective is generated according to a merging processing result, where the third image perspective is actual output data. Thus, network parameters of the original neural network model are adjusted according to the third image perspective and the first image perspective, for example, a loss function is calculated according to the difference between the third image perspective and the first image perspective, and the network parameters are adjusted according to a calculation result.

Figure 4B:
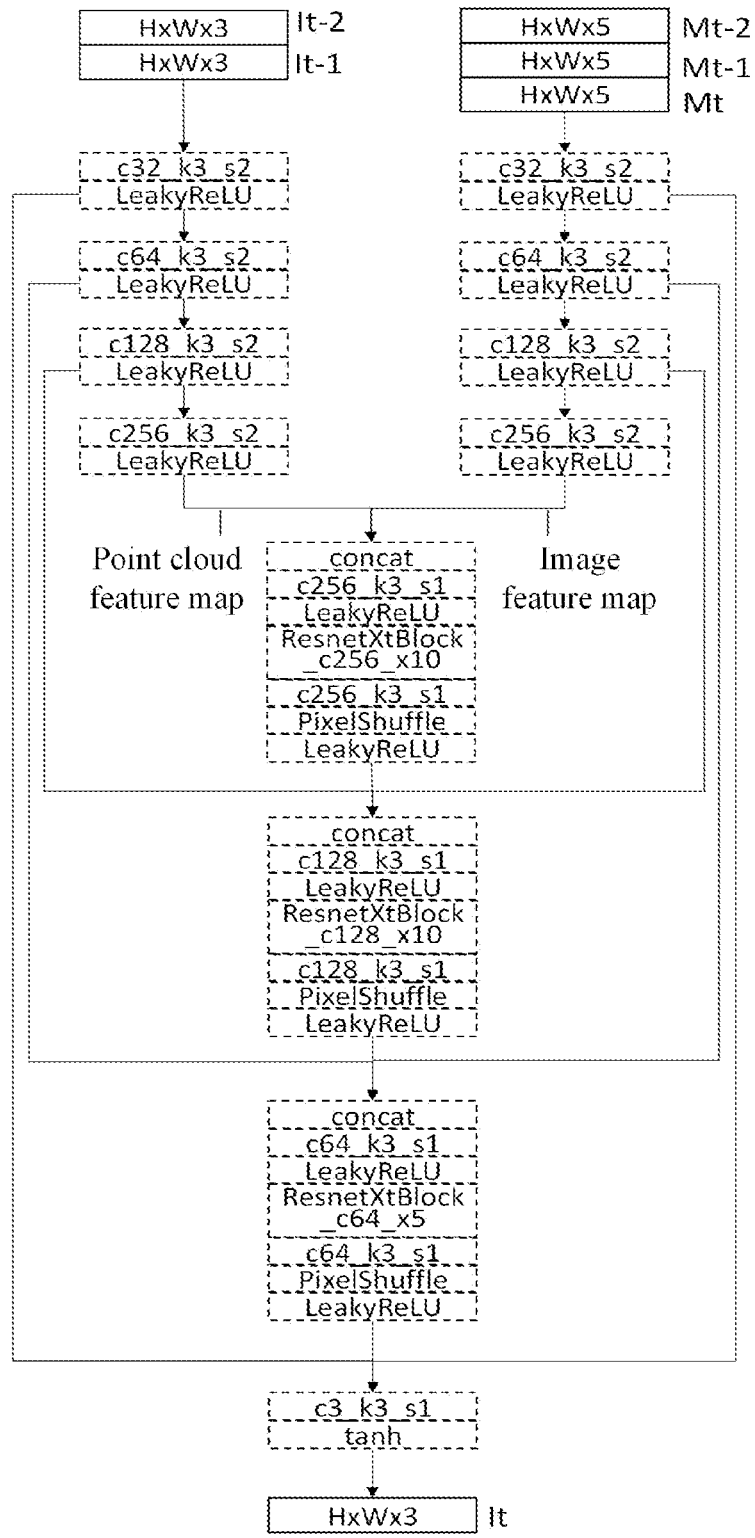
FIG. 4B is a schematic diagram of an original neural network model for a sequence frame conversion in a model generation method according to embodiment one of the present application.

The original neural network model of the present embodiment is exemplarily described below in connection with specific examples. Exemplarily, when the first point cloud perspective, the second point cloud perspective, the first image perspective, and the second image perspective are used as one group of training samples, in order to interact with the training samples, the schematic diagram of the original neural network model is shown in FIG. 4B, which is an image conversion model from a sequential frame point cloud perspective to a single frame image perspective. Compared to the original neural network model shown in FIG. 4A, the neurons in the network layers of the original neural network model shown in FIG. 4B may further include a cascading layer concat, Mt in the data layer is the first point cloud perspective, Mt-2 and Mt-1 are each the second point cloud perspective, It is a first image perspective, It-2 is a second image perspective which is a perspective assigned to the same image collection time point as Mt-2, and It-1 is also a second image perspective which is a perspective assigned to the same image collection time point as Mt-1. In addition, the dimension of the channel concatenation result of Mt-2, Mt-1, and Mt is $H*W*(3*C)$, and the dimension of the channel concatenation result of It-2 and It-1 is $H*W*6$.

Exemplarily, the time interval of 1 second for multiple image collection time points is used as an example, if Mt and It are the point cloud perspective and the image perspective at the 10th second, respectively, Mt-1 and It-1 are the point cloud perspective and the image perspective at the 9th second, respectively, and Mt-2 and It-2 are the point cloud perspective and the image perspective at the 8th second, respectively. At this time, 3 point cloud perspectives at 8th to 10th seconds and 2 image perspectives at 8th to 9th seconds are used as actual input data, and the image perspective at 10th second is used as the expected output data and is jointly input into the original neural network model for model training.

It should be noted that after the image conversion model is obtained based on the training of the original neural network model as shown in FIG. 4B, any one frame of image perspective is unknown during the application phase of the image conversion model, which means that the 3rd frame of image perspective cannot be predicted based on the first 3 frames of point cloud perspectives and the first 2 frames of image perspectives. In order to solve the problem, an optional scheme is that when the original neural network model is trained, the first two frames of point cloud perspectives are set to be empty, random numbers or the like, and a training is started from the third frame of point cloud perspective, so that in the application stage of the image conversion model, it is also possible to directly set the first two frames of image perspectives to be empty, random numbers or the like, and to perform a prediction from the third frame of image perspective.

Embodiment Two

Figure 5:
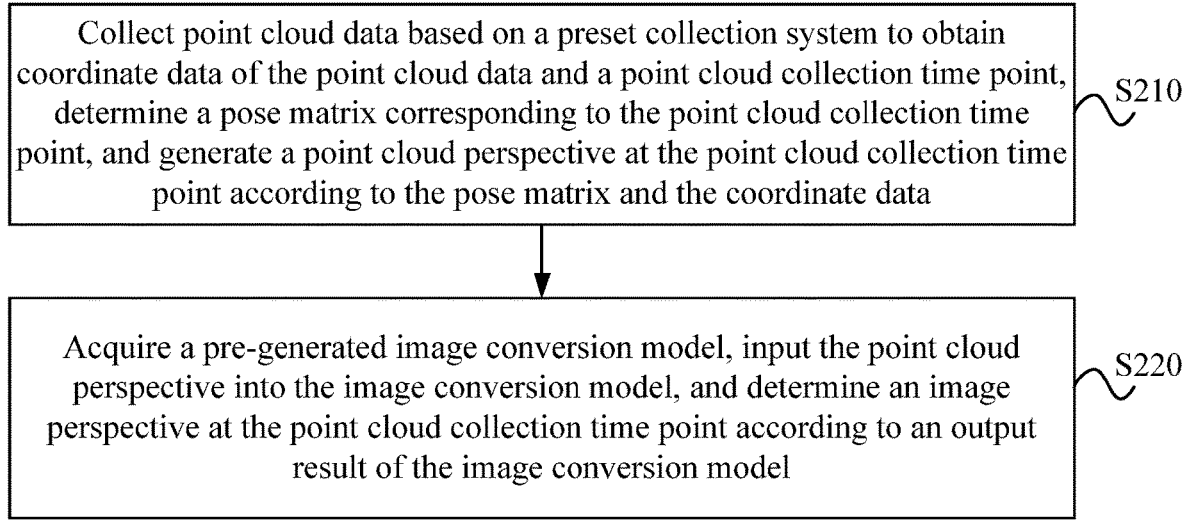
FIG. 5 is a flowchart of a model generation method according to embodiment two of the present application.

FIG. 5 is a flowchart of an image perspective determining method according to embodiment two of the present application. This embodiment may be applicable to a case of synthesizing an image perspective based on point cloud data and a pre-generated image conversion model. The method may be executed by an image perspective determining apparatus provided in the embodiment of the present application, the apparatus may be implemented by software and/or hardware, and the apparatus may be integrated on various user terminals or servers.

Referring to FIG. 5, the method in the embodiment of the present application includes steps S210 to S220.

In S210, point cloud data is collected based on a preset collection system to obtain coordinate data of the point cloud data and a point cloud collection time point, a pose matrix corresponding to the point cloud collection time point is determined, and a point cloud perspective at the point cloud collection time point is generated according to the pose matrix and the coordinate data.

The point cloud collection time point simulates the image collection time point of the image perspective, and the point cloud perspective at the point cloud collection time point may be synthesized according to the pose matrix corresponding to the point cloud collection time point and the coordinate data of the point cloud data.

In an embodiment, the pose matrix may be determined according to the following steps that: a mapping is performed on the collected point cloud data, and a pose trajectory of the present collection system is obtained in the mapping process. Exemplarily, a time sequence sampling is performed on the pose trajectory according to the point cloud collection time point, and a pose matrix corresponding to each point cloud collection time point is acquired according to a time sequence sampling result.

In S220, an image conversion model generated according to the model generation method provided in any of the embodiments of the present application is acquired, the point cloud perspective is input into the image conversion model, and an image perspective at the point cloud collection time point is determined according to an output result of the image conversion model.

According to the above technical scheme, firstly, only a point cloud acquisition device needs to be set in the preset collection system, expensive image collection device does not need to be set, so that the cost is relatively low; secondly, only the point cloud perspective needs to be input into the trained image conversion model, the image perspective at a same collection time point may be predicted, and thus no space-time calibration is needed, and the operation is simple; furthermore, an image perspective with a high quality obtained through the image conversion model may be ensured by improving the quality of training samples.

According to the technical scheme of the embodiment of the present application, the coordinate data of the point cloud data and the point cloud collection time point may be obtained based on the point cloud data collected by the preset collection system, and the point cloud collection time point simulates the image collection time point of the image perspective; further, after the pose matrix corresponding to the point cloud collection time point is determined, the point cloud perspective at the point cloud collection time point may be generated according to the pose matrix and the coordinate data, that is, point cloud data of three-dimensional scene points is projected to a virtual camera at the image collection time point to form the point cloud perspective. In this way, after the point cloud perspective is input into the pre-generated image conversion model, the image perspective at the point cloud collection time point may be determined according to the output result of the image conversion model. According to the above technical scheme, the image perspective may be guided and synthesized based on the point cloud perspective projected by the point cloud data, and thus the problem that an acquiring process of the image perspective is relatively time-consuming and labor-intensive is solved, and the effect of acquiring the image perspective with a high quality in a manner of simple operation and low cost is achieved.

Embodiment Three

Figure 6:
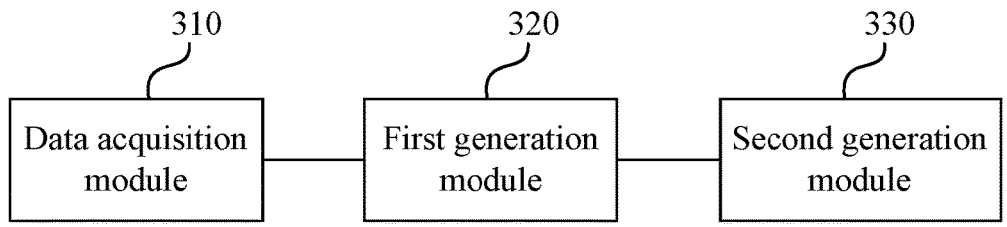
FIG. 6 is a structural block diagram of a model generation apparatus according to embodiment three of the present application.

FIG. 6 is a structural block diagram of a model generation apparatus according to an embodiment three of the present application, the apparatus is configured to perform the model generation method provided in any of the embodiments described above. The apparatus belongs to the same inventive concept as the model generation method in each of the above-described embodiments, and details not described in the embodiment of the model generation apparatus may be referred to the above-described embodiment of the model generation method. Referring to FIG. 6, the apparatus may include a data acquisition module 310, a first generation module 320, and a second generation module 330.

The data acquisition module 310 is configured to collect point cloud data and multiple image perspectives based on a preset collection system to obtain coordinate data of the point cloud data and multiple image collection time points, where each image collection time point of the multiple image collection time points corresponds to a respective one image perspective of the multiple image perspectives.

The first generation module 320 is configured to determine a pose matrix corresponding to each image collection time point of the multiple image collection time points, and generate a point cloud perspective at each image collection time point according to the pose matrix corresponding to the each image collection time point and the coordinate data.

The second generation module 330 is configured to use the point cloud perspective at each image collection time point and the respective one image perspective at the each image collection time point as a group of training samples, train an original neural network model based on multiple groups of training samples, and generate an image conversion model for converting a point cloud perspective into an image perspective.

In an embodiment, the first generation module 320 may include a pose trajectory obtaining unit and a pose matrix obtaining unit. The pose trajectory obtaining unit is configured to obtain a pose trajectory of the preset collection system according to the point cloud data. The pose matrix obtaining unit is configured to sample the pose trajectory based on the multiple image collection time points to obtain the pose matrix corresponding to each image collection time point of the multiple image collection time points.

In an embodiment, the first generation module 320 is configured to perform the following operations: in a case where the respective one image perspective is collected based on a preset camera in the preset collection system, where the preset camera includes a perspective camera or a wide-angle camera, projecting three-dimensional coordinate data $P_{W\_3d}$ of the point cloud data in a world coordinate system to two-dimensional coordinate data $P_{C\_2d}(t_C)$ in a preset camera coordinate system collected at each image collection time point $t_C$ according to a following formula, and generating the point cloud perspective at $t_C$ according to multiple pieces of $P_{C\_2d}(t_C)$: $P_{C\_2d}(t_C)=K_c M_{W\to L}(t_C) P_{W\_3d}$, where $M_{W\to L}(t_C)$ is a pose matrix of a point cloud collection device in the preset collection system in the world coordinate system at $t_C$, and $K_c$ is an internal reference matrix of the preset camera; and in a case where the respective one image perspective is collected based on a spherical panorama camera in the preset collection system, projecting $P_{W\_3d}$ of the point cloud data to $P_{C\_2d}(t_C)$ in a spherical panorama camera coordinate system collected at $t_C$ according to a following formula, and generating the point cloud perspective at $t_C$ according to multiple pieces of $P_{C\_2d}(t_C)$:

$$P_{3d}=M_{W\to L}(t_C)P_{W\_3d}, P_{3d}=[x_{3d}, y_{3d}, z_{3d}],$$

$$P_{2d}=R[\arctan(\sqrt{x_{3d}^2+z_{3d}^2}/y_{3d})+\pi, \arctan(x_{3d}/z_{3d})+\pi/2],$$

R is a sphere radius of the spherical panorama camera.

In an embodiment, the apparatus may further include an attribute information assignment module which is configured to acquire pixel points corresponding to the point cloud data in the point cloud perspective, and assign attribute information of the point cloud data to the pixel points.

In an embodiment, the second generation module 330 is further configured to: use point cloud perspectives at at least two image collection time points and image perspectives corresponding to the point cloud perspectives at the at least two image collection time points as one group of training samples.

In an embodiment, the second generation module 330 may include a first obtaining unit, a second obtaining unit and a training sample obtaining unit. The first obtaining unit is configured to use a point cloud perspective at a current image collection time point of the multiple image collection time points as a first point cloud perspective, and use an image perspective at the current image collection time point as a first image perspective. The second obtaining unit is configured to use a point cloud perspective at at least one image collection time point before the current image collection time point as a second point cloud perspective, and use an image perspective at the at least one image collection time point before the current image collection time point as a second image perspective. The training sample obtaining unit is configured to use the first point cloud perspective, the second point cloud perspective, the first image perspective, and the second image perspective as the one group of training samples, where the first point cloud perspective, the second point cloud perspective, and the second image perspective are actual input data, and the first image perspective is expected output data.

In an embodiment, the second generation module 330 may further include an input unit, a feature map obtaining unit and a network parameter adjustment unit. The input unit is configured to input the groups of training samples into the original neural network model in a case where the original neural network model includes a point cloud convolution excitation module, an image convolution excitation module and a merging processing module. The feature map obtaining unit is configured to process a channel cascade result of the first point cloud perspective and the second point cloud perspective through the point cloud convolution excitation module to obtain a point cloud feature map, and process the second image perspective through the image convolution excitation module to obtain an image feature map. The network parameter adjustment unit is configured to merge the point cloud feature map and the image feature map through the merging processing module, generate a third image perspective according to a merging processing result, and adjust a network parameter of the original neural network model according to the third image perspective and the first image perspective.

According to the model generation apparatus provided by the embodiment three of the present application, the data acquisition module may obtain coordinate data of the point cloud data and multiple image collection time points based on the point cloud data and multiple image perspectives collected by the preset collection system, where each image collection time point of the multiple image collection time points corresponds to a respective one image perspective of the multiple image perspectives; further, after the first generation module may determine the pose matrix corresponding to each image collection time point of the multiple image collection time points and generate a point cloud perspective at each image collection time point according to the pose matrix corresponding to each image collection time point and the coordinate data, that is, point cloud data of three-dimensional scene points are projected to a virtual camera at the image collection time point to form the point cloud perspective, whereby the second generation module uses the point cloud perspective at each image collection time point and the image perspective at each image collection time point as one group of training samples, trains the original neural network model based on multiple groups of training samples, and generates the image conversion model for converting the point cloud perspective into the image perspective. According to the above-described apparatus, the image perspective may be guided and synthesized based on the point cloud perspective projected by the point cloud data, and thus the problem that the acquiring process of the image perspective is relatively time-consuming and labor-intensive is solved, and the effect of acquiring the image perspective with a high quality in a manner of simple operation and low cost is achieved.

The model generation apparatus provided in the embodiments of the present application may perform the model generation method provided in any of the embodiments of the present application, and has a corresponding functional module and a beneficial effect for performing the method.

It should be noted that, in the embodiments of the above-described model generation apparatus, each unit and module included is only divided according to the functional logic, but is not limited to the above division as long as the corresponding functions can be implemented; in addition, names of functional units are merely for convenience of distinguishing from each other, and are not intended to limit the protection scope of the present application.

Embodiment Four

Figure 7:
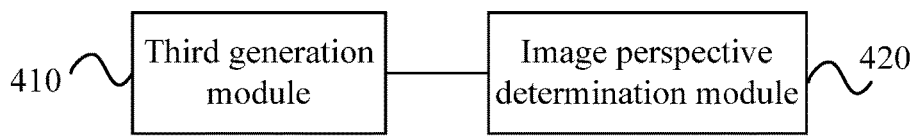
FIG. 7 is a structural block diagram of an image perspective determining apparatus according to embodiment four of the present application.

FIG. 7 is a structural block diagram of an image perspective determining apparatus according to embodiment four of the present application, and the apparatus is configured to perform the image perspective determining method provided in any of the embodiments described above. The apparatus belongs to a same inventive concept as the image perspective determining method of the embodiments described above, and details not described in the embodiment of the image perspective determining apparatus may be referred to the embodiments of the image perspective determining method described above. Referring to FIG. 7, the apparatus may include a third generation module 410 and an image perspective determination module 420.

The third generation module 410 is configured to collect point cloud data based on a preset collection system to obtain coordinate data of the point cloud data and a point cloud collection time point, determine a pose matrix corresponding to the point cloud collection time point, and generate a point cloud perspective at the point cloud collection time point according to the pose matrix and the coordinate data.

The image perspective determination module 420 is configured to acquire the image conversion model generated according to the model generation method provided in any of the embodiments of the present application, input the point cloud perspective into the image conversion model, and determine an image perspective at the point cloud collection time point according to an output result of the image conversion model.

According to the image perspective determining apparatus provided in the embodiment four of the present application, the third generation module obtains the coordinate data of the point cloud data and the point cloud collection time point based on the point cloud data collected by the preset collection system, the point cloud collection time point simulates the image collection time point of the image perspective, and moreover, after the pose matrix corresponding to the point cloud collection time point is determined, a point cloud perspective at the point cloud collection time point may be generated according to the pose matrix and the coordinate data, that is, the point cloud data of the three-dimensional scene point is projected to a virtual camera at the point cloud collection time point to form the point cloud perspective; after the image perspective determination module inputs the point cloud perspective into the pre-generated image conversion model, the image perspective at the point cloud collection time point may be determined according to an output result of the image conversion model. According to the above-described apparatus, the image perspective may be guided and synthesized based on the point cloud perspective projected by the point cloud data, and thus the problem that the acquiring process of the image perspective is relatively time-consuming and labor-intensive is solved, and the effect of acquiring the image perspective with a high quality in a manner of simple operation and low cost is achieved.

The image perspective determining apparatus provided in the embodiments of the present application may perform the image perspective determining method provided in any of the embodiments of the present application, and has a corresponding functional module and a beneficial effect for performing the method.

It should be noted that, in the embodiments of the above-described image perspective determining apparatus, each unit and module included is only divided according to the functional logic, but is not limited to the above division as long as the corresponding functions can be realized; in addition, specific names of functional units are merely for convenience of distinguishing from each other, and are not intended to limit the protection scope of the present application.

Embodiment Five

Figure 8:
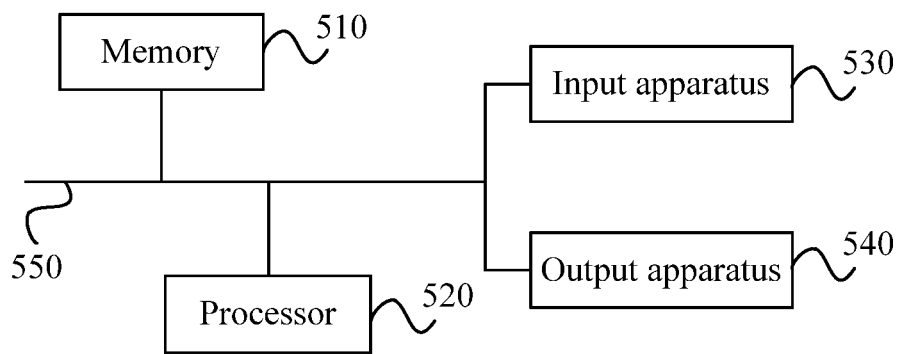
FIG. 8 is a schematic structural diagram of a device according to embodiment five of the present application.

FIG. 8 is a schematic structural diagram of a device according to embodiment five of the present application. As shown in FIG. 8, the device includes a memory 510, a processor 520, an input apparatus 530, and an output apparatus 540. The number of processors 520 in the device may be at least one. One processor 520 is taken as an example in FIG. 8. The memory 510, the processor 520, the input apparatus 530, and the output apparatus 540 in the device may be connected by a bus or in other manners, for example, they are connected by a bus 550 in FIG. 8.

The memory 510 serves as a computer-readable storage medium may be configured to store software programs, computer-executable programs and modules, such as program instructions/modules (such as, the data acquisition module 310, the first generation module 320 and the second generation module 330 in the model generation apparatus) corresponding to the model generation method in the embodiments of the present application, or program instructions/modules (such as, the third generation module 410 and the image perspective determination module 420 in the image perspective determining apparatus) corresponding to the image perspective determining method in the embodiments of the present application. The processor 520 executes various functional applications and data processing of the device by executing software programs, instructions, and modules stored in the memory 510, i.e., implements the model generation method or the image perspective determining method described above.

The memory 510 may mainly include a program storage region and a data storage region, where the program storage region may store an operating system, an application program required for at least one function; the data storage region may store data created according to use of the device, and the like. In addition, the memory 510 may include a high-speed random access memory and may also include a non-volatile memory, such as at least one magnetic disk storage device, flash memory device, or other non-volatile solid-state memory devices. In some instances, the memory 510 may include a memory remotely disposed with respect to the processor 520, and the remote memory may be connected to the device over a network. Instances of such networks include, but are not limited to, an Internet, an intranet, a local area network, a mobile communication network, and combinations thereof.

The input apparatus 530 may be configured to receive input digital or character information and to generate key signal inputs related to user settings and function controls of the apparatus. The output apparatus 540 may include a display device such as a display screen.

Embodiment Six

The embodiment six of the present application provides a storage medium including a computer-executable instruction, the computer-executable instruction is configured to, when executed by a computer processor, perform a model generation method, and the method includes that: point cloud data and multiple image perspectives are collected based on a preset collection system to obtain coordinate data of the point cloud data and multiple image collection time points, where each image collection time point of the multiple image collection time points corresponds to a respective one image perspective of the multiple image perspectives; a pose matrix corresponding to each image collection time point of the multiple image collection time points is determined, and a point cloud perspective at each image collection time point is generated according to the pose matrix corresponding to the each image collection time point and the coordinate data; and the point cloud perspective at each image collection time point and the respective one image perspective at the each image collection time point are used as a group of training samples, an original neural network model is trained based on multiple groups of training samples, and an image conversion model for converting a point cloud perspective into an image perspective is generated.

Of course, according to the storage medium including the computer-executable instruction provided in the embodiments of the present application, the computer-executable instruction is not limited to the method operations described above, and may also perform related operations in the model generation method provided in any of the embodiments of the present application.

Embodiment Seven

The embodiment seven of the present application provides a storage medium including a computer-executable instruction, the computer-executable instruction is configured to, when executed by a computer processor, perform an image perspective determining method, and the method includes that: point cloud data is collected based on a preset collection system to obtain coordinate data of the point cloud data and a point cloud collection time point, a pose matrix corresponding to the point cloud collection time point is determined, and a point cloud perspective at the point cloud collection time point is generated according to the pose matrix and the coordinate data; an image conversion model generated according to the model generation method provided in any of the embodiments of the present application is acquired, the point cloud perspective is input into the image conversion model, and an image perspective at the point cloud collection time point is determined according to an output result of the image conversion model.

Through the description of the above embodiments, those skilled in the art may clearly understand that the present application may be implemented by means of software plus a necessary universal hardware, and of course, may also be implemented by hardware. Based on this understanding, the technical scheme of the present application, either essentially or in terms of contributions to the related art, may be embodied in the form of a software product, the computer software product is stored in a computer-readable storage medium such as a floppy disk of a computer, a read-only memory (ROM), a random access memory (RAM), a flash, a hard disk or an optical disc, and includes several instructions for causing a computer device (which may be a personal computer, a server, a network device or the like) to perform the methods described in the embodiments of the present application.

What is claimed is:
1. A model generation method, comprising:
collecting point cloud data and a plurality of image perspectives based on a preset collection system to obtain coordinate data of the point cloud data and a plurality of image collection time points, wherein each image collection time point of the plurality of image collection time points corresponds to a respective one image perspective of the plurality of image perspectives;
determining a pose matrix corresponding to each image collection time point of the plurality of image collection time points, and generating a point cloud perspective at each image collection time point according to the pose matrix corresponding to the each image collection time point and the coordinate data; and
using the point cloud perspective at each image collection time point and the respective one image perspective at the each image collection time point as a group of training samples, training an original neural network model based on a plurality of groups of training samples, and generating an image conversion model for converting a point cloud perspective into an image perspective;

the model generation method further comprises: using point cloud perspectives at at least two image collection time points and image perspectives corresponding to the point cloud perspectives at the at least two image collection time points as one group of training samples;

wherein using the point cloud perspectives at the at least two image collection time points and the image perspectives corresponding to the point cloud perspectives at the at least two image collection time points as the one group of training samples comprises:

using a point cloud perspective at a current image collection time point of the plurality of image collection time points as a first point cloud perspective, and using an image perspective at the current image collection time point as a first image perspective;

using a point cloud perspective at at least one image collection time point before the current image collection time point as a second point cloud perspective, and using an image perspective at the at least one image collection time point before the current image collection time point as a second image perspective; and using the first point cloud perspective, the second point cloud perspective, the first image perspective, and the second image perspective as the one group of training samples, wherein the first point cloud perspective, the second point cloud perspective, and the second image perspective are actual input data, and the first image perspective is expected output data;

wherein the original neural network model includes a point cloud convolution excitation module, an image convolution excitation module, and a merging processing module, and wherein training the original neural network model based on the plurality of groups of training samples comprises:

inputting the plurality of groups of training samples into the original neural network model;

processing, through the point cloud convolution excitation module, a channel cascade result of the first point cloud perspective and the second point cloud perspective to obtain a point cloud feature map, and processing, through the image convolution excitation module, the second image perspective to obtain an image feature map; and merging, through the merging processing module, the point cloud feature map and the image feature map, generating a third image perspective according to a merging processing result, and adjusting a network parameter of the original neural network model according to the third image perspective and the first image perspective.

2. The method of claim 1, wherein determining the pose matrix corresponding to each image collection time point of the plurality of image collection time points comprises:

obtaining a pose trajectory of the preset collection system according to the point cloud data; and sampling the pose trajectory based on the plurality of image collection time points to obtain the pose matrix corresponding to each image collection time point of the plurality of image collection time points.

3. The method of claim 1, further comprising:

acquiring pixel points corresponding to the point cloud data in the point cloud perspective, and assigning attribute information of the point cloud data to the pixel points.

4. An image perspective determining method, comprising:

collecting point cloud data based on a preset collection system to obtain coordinate data of the point cloud data and a point cloud collection time point, determining a pose matrix corresponding to the point cloud collection time point, and generating a point cloud perspective at the point cloud collection time point according to the pose matrix and the coordinate data; and acquiring the image conversion model generated according to the model generation method of claim 1, inputting the point cloud perspective into the image conversion model, and determining an image perspective at the point cloud collection time point according to an output result of the image conversion model.

5. A model generation apparatus, comprising: at least one processor, and a memory which is configured to store at least one program, wherein the at least one program, when executed by the at least one processor, causes the at least one processor to implement:

collecting point cloud data and a plurality of image perspectives based on a preset collection system to obtain coordinate data of the point cloud data and a plurality of image collection time points, wherein each image collection time point of the plurality of image collection time points corresponds to a respective one image perspective of the plurality of image perspectives;

determining a pose matrix corresponding to each image collection time point of the plurality of image collection time points, and generating a point cloud perspective at each image collection time point according to the pose matrix corresponding to the each image collection time point and the coordinate data; and using the point cloud perspective at each image collection time point and the respective one image perspective at the each image collection time point as a group of training samples, training an original neural network model based on a plurality of groups of training samples, and generating an image conversion model for converting a point cloud perspective into an image perspective;

wherein the at least one program, when executed by the at least one processor, causes the at least one processor to further implement: using point cloud perspectives at at least two image collection time points and image perspectives corresponding to the point cloud perspectives at the at least two image collection time points as one group of training samples;

wherein using the point cloud perspectives at the at least two image collection time points and the image perspectives corresponding to the point cloud perspectives at the at least two image collection time points as the one group of training samples comprises:

using a point cloud perspective at a current image collection time point of the plurality of image collection time points as a first point cloud perspective, and using an image perspective at the current image collection time point as a first image perspective;

using a point cloud perspective at at least one image collection time point before the current image collection time point as a second point cloud perspective, and using an image perspective at the at least one image collection time point before the current image collection time point as a second image perspective; and using the first point cloud perspective, the second point cloud perspective, the first image perspective, and the second image perspective as the one group of training samples, wherein the first point cloud perspective, the second point cloud perspective, and the second image perspective are actual input data, and the first image perspective is expected output data;

wherein the original neural network model includes a point cloud convolution excitation module, an image convolution excitation module, and a merging processing module, and wherein training the original neural network model based on the plurality of groups of training samples comprises:

inputting the plurality of groups of training samples into the original neural network model;

processing, through the point cloud convolution excitation module, a channel cascade result of the first point cloud perspective and the second point cloud perspective to obtain a point cloud feature map, and processing, through the image convolution excitation module, the second image perspective to obtain an image feature map; and merging, through the merging processing module, the point cloud feature map and the image feature map, generating a third image perspective according to a merging processing result, and adjusting a network parameter of the original neural network model according to the third image perspective and the first image perspective.

6. An image perspective determining apparatus, comprising: at least one processor, and a memory which is configured to store at least one program, wherein the at least one program, when executed by the at least one processor, causes the at least one processor to implement:

collecting point cloud data based on a preset collection system to obtain coordinate data of the point cloud data and a point cloud collection time point, determining a pose matrix corresponding to the point cloud collection time point, and generating a point cloud perspective at the point cloud collection time point according to the pose matrix and the coordinate data; and acquiring the image conversion model generated by the model generation apparatus of claim 5, inputting the point cloud perspective into the image conversion model, and determining an image perspective at the point cloud collection time point according to an output result of the image conversion model.

7. A non-transitory computer-readable storage medium, storing a computer program, wherein the computer program, when executed by a processor, implements a model generation method;

wherein the model generation method comprises:

collecting point cloud data and a plurality of image perspectives based on a preset collection system to obtain coordinate data of the point cloud data and a plurality of image collection time points, wherein each image collection time point of the plurality of image collection time points corresponds to a respective one image perspective of the plurality of image perspectives;

determining a pose matrix corresponding to each image collection time point of the plurality of image collection time points, and generating a point cloud perspective at each image collection time point according to the pose matrix corresponding to the each image collection time point and the coordinate data; and using the point cloud perspective at each image collection time point and the respective one image perspective at the each image collection time point as a group of training samples, training an original neural network model based on a plurality of groups of training samples, and generating an image conversion model for converting a point cloud perspective into an image perspective;

the model generation method further comprises: using point cloud perspectives at at least two image collection time points and image perspectives corresponding to the point cloud perspectives at the at least two image collection time points as one group of training samples;

wherein using the point cloud perspectives at the at least two image collection time points and the image perspectives corresponding to the point cloud perspectives at the at least two image collection time points as the one group of training samples comprises:

using a point cloud perspective at a current image collection time point of the plurality of image collection time points as a first point cloud perspective, and using an image perspective at the current image collection time point as a first image perspective;

using a point cloud perspective at at least one image collection time point before the current image collection time point as a second point cloud perspective, and using an image perspective at the at least one image collection time point before the current image collection time point as a second image perspective; and using the first point cloud perspective, the second point cloud perspective, the first image perspective, and the second image perspective as the one group of training samples, wherein the first point cloud perspective, the second point cloud perspective, and the second image perspective are actual input data, and the first image perspective is expected output data;

wherein the original neural network model includes a point cloud convolution excitation module, an image convolution excitation module, and a merging processing module, and wherein training the original neural network model based on the plurality of groups of training samples comprises:

inputting the plurality of groups of training samples into the original neural network model;

processing, through the point cloud convolution excitation module, a channel cascade result of the first point cloud perspective and the second point cloud perspective to obtain a point cloud feature map, and processing, through the image convolution excitation module, the second image perspective to obtain an image feature map; and merging, through the merging processing module, the point cloud feature map and the image feature map, generating a third image perspective according to a merging processing result, and adjusting a network parameter of the original neural network model according to the third image perspective and the first image perspective.

8. The model generation apparatus of claim 5, wherein the at least one program, when executed by the at least one processor, causes the at least one processor to implement determining the pose matrix corresponding to each image collection time point of the plurality of image collection time points in the following way:

obtaining a pose trajectory of the preset collection system according to the point cloud data; and sampling the pose trajectory based on the plurality of image collection time points to obtain the pose matrix corresponding to each image collection time point of the plurality of image collection time points.

9. The model generation apparatus of claim 5, wherein the at least one program, when executed by the at least one processor, causes the at least one processor to further implement:

acquiring pixel points corresponding to the point cloud data in the point cloud perspective, and assigning attribute information of the point cloud data to the pixel points.

* * * * *